United States Patent
Lee et al.

(10) Patent No.: US 8,340,122 B2
(45) Date of Patent: Dec. 25, 2012

(54) REFERENCE SIGNAL TRANSMISSION METHOD FOR DOWNLINK MULTIPLE INPUT MULTIPLE OUTPUT SYSTEM

(75) Inventors: Jung Hoon Lee, Anyang-si (KR); Dong Youn Seo, Seoul (KR); Ki Jun Kim, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 12/921,073

(22) PCT Filed: Jul. 22, 2009

(86) PCT No.: PCT/KR2009/004064
§ 371 (c)(1),
(2), (4) Date: Oct. 25, 2010

(87) PCT Pub. No.: WO2010/016668
PCT Pub. Date: Feb. 11, 2010

(65) Prior Publication Data
US 2011/0188438 A1  Aug. 4, 2011

Related U.S. Application Data

(60) Provisional application No. 61/086,462, filed on Aug. 5, 2008.

(30) Foreign Application Priority Data

Jun. 15, 2009 (KR) .................. 10-2009-0052779

(51) Int. Cl.
*H04J 3/00* (2006.01)
(52) U.S. Cl. ...................................... 370/464
(58) Field of Classification Search .................... None
See application file for complete search history.

(56) References Cited

U.S. PATENT DOCUMENTS

| | | | | |
|---|---|---|---|---|
| 7,430,193 | B2 * | 9/2008 | Kim et al. | 370/338 |
| 7,564,829 | B2 * | 7/2009 | Jin et al. | 370/343 |
| 8,130,630 | B2 * | 3/2012 | Ahn et al. | 370/208 |
| 2007/0274253 | A1 * | 11/2007 | Zhang et al. | 370/328 |
| 2008/0247479 | A1 * | 10/2008 | Ma et al. | 375/260 |
| 2008/0285669 | A1 * | 11/2008 | Walton et al. | 375/260 |
| 2010/0074305 | A1 * | 3/2010 | Lee et al. | 375/135 |

(Continued)

FOREIGN PATENT DOCUMENTS

| | | |
|---|---|---|
| KR | 10-2006-0035941 A | 4/2006 |
| KR | 10-2007-0101808 A | 10/2007 |
| WO | WO 2004-064295 A2 | 7/2004 |
| WO | WO 2007/021384 | 2/2007 |
| WO | WO 2007-117127 A1 | 10/2007 |

*Primary Examiner* — Fan Ng
(74) *Attorney, Agent, or Firm* — McKenna Long & Aldridge LLP

(57) ABSTRACT

A reference signal transmission method in a downlink MIMO system is disclosed. The downlink MIMO system supports a first UE supporting N transmission antennas among a total of M transmission antennas (where M>N) and a second UE supporting the M transmission antennas. The method includes transmitting, by a base station (BS), subframe-associated information which designates a first subframe in which data for the first UE and the second UE is transmitted and a second subframe in which data only for the second UE can be transmitted within a radio frame having a plurality of subframes, and transmitting the first subframe and the second subframe. Reference signals corresponding to antenna ports '0' to 'N−1' of the N antennas are mapped to the first subframe, and reference signals corresponding to antenna ports '0' to 'M−1' of the M antennas are mapped to the second subframe.

14 Claims, 15 Drawing Sheets

U.S. PATENT DOCUMENTS

| | | |
|---|---|---|
| 2010/0085925 A1* | 4/2010 | Kishiyama et al. ........... 370/329 |
| 2011/0170435 A1* | 7/2011 | Kim et al. ..................... 370/252 |
| 2011/0188438 A1* | 8/2011 | Lee et al. ...................... 370/312 |
| 2011/0194551 A1* | 8/2011 | Lee et al. ...................... 370/342 |
| 2011/0228718 A1* | 9/2011 | Noh et al. ..................... 370/312 |
| 2011/0274205 A1* | 11/2011 | Lee et al. ...................... 375/295 |
| 2012/0027120 A1* | 2/2012 | Noh et al. ..................... 375/295 |
| 2012/0195285 A1* | 8/2012 | Ko et al. ....................... 370/330 |

\* cited by examiner

N Ant.

M Ant.

REFERENCE SIGNAL TRANSMISSION METHOD FOR DOWNLINK MULTIPLE INPUT MULTIPLE OUTPUT SYSTEM

This application is a 35 U.S.C. §371 National Stage entry of International Application No. PCT/KR2009/004064, filed on Jul. 22, 2009, and claims priority date to U.S. Provisional Application No. 61/086,462, filed Aug. 5, 2008 and Korean Application No. 10-2009-0052779, filed on Jun. 15, 2009, all of which are hereby incorporated by reference in their entireties.

TECHNICAL FIELD

The present invention relates to a Multiple Input Multiple Output (MIMO) communication system, and more particularly to a method for effectively providing data and a reference signal under an environment in which an antenna is added to a conventional system.

BACKGROUND ART (1) Definition of MIMO Technology

A conventional MIMO technology will hereinafter be described in detail.

In brief, MIMO technology is an abbreviation for Multi-Input Multi-Output technology. MIMO technology uses multiple transmission (Tx) antennas and multiple reception (Rx) antennas to improve the efficiency of Tx/Rx data, whereas a conventional art has generally used one transmission (Tx) antenna and one reception (Rx) antenna. In other words, MIMO technology allows a transmission end or reception end of a wireless communication system to use multiple antennas (hereinafter referred to as a multi-antenna), so that the capacity or performance can be improved. For convenience of description, the term "MIMO" can also be considered to be a multi-antenna technology.

In more detail, MIMO technology is not dependent on one antenna path to receive one total message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or repeaters. MIMO technology can extend the range of data communication, so that it can overcome the limited amount of transmission (Tx) data of mobile communication systems reaching a critical situation.

(2) System Modeling in MIMO

FIG. 1 is a block diagram illustrating a general MIMO communication system.

Referring to FIG. 1, if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that a transfer rate and a frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \qquad \text{[Equation 1]}$$

For example, provided that a MIMO system uses four transmission (Tx) antennas and four reception (Rx) antennas, the MIMO system can theoretically acquire a high transfer rate which is four times higher than that of a one antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

A variety of MIMO-associated technologies have been intensively researched by many companies or developers, for example, research into an information theory associated with a MIMO communication capacity calculation under various channel environments or multiple access environments, research into a radio frequency (RF) channel measurement and modeling of the MIMO system, and research into a space-time signal processing technology. A mathematical modeling of a communication method for use in the above-mentioned MIMO system will hereinafter be described in detail.

As can be seen from FIG. 1, it is assumed that there are $N_T$ transmission (Tx) antennas and $N_R$ reception (Rx) antennas. In the case of a transmission (Tx) signal, a maximum number of transmission information pieces is $N_T$ under the condition that $N_T$ transmission (Tx) antennas are used, so that the transmission (Tx) information can be represented by a specific vector shown in the following equation 2.

$$s = [s_1, s_2, \ldots, s_{N_T}]^T \qquad \text{[Equation 2]}$$

In the meantime, individual transmission (Tx) information pieces ($s_1, s_2, \ldots, s_{N_T}$) may have different transmission powers. In this case, if the individual transmission powers are denoted by ($P_1, P_2, \ldots, P_{N_T}$), transmission (Tx) information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, $\hat{s}$ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the meantime, the information vector $\hat{S}$ having an adjusted transmission power is applied to a weight matrix (W), so that $N_T$ transmission (Tx) signals ($x_1, x_2, \ldots, x_{N_T}$) to be actually transmitted are configured. In this case, the weight matrix (W) is adapted to properly distribute transmission (Tx) information to individual antennas according to transmission channel situations. The above-mentioned transmission (Tx) signals ($x_1, x_2, \ldots, x_{N_T}$) can be represented by the following equation 5 using the vector (X).

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Next, if $N_R$ reception (Rx) antennas are used, reception (Rx) signals ($y_1, y_2, \ldots, y_{N_R}$) of individual antennas can be represented by a specific vector (y) shown in the following equation 6.

$$y = [y_1, y_2, \ldots, y_{N_R}]^T$$ [Equation 6]

In the meantime, if a channel modeling is executed in the MIMO communication system, individual channels can be distinguished from each other according to transmission/reception (Tx/Rx) antenna indexes. A specific channel passing the range from a transmission (Tx) antenna (j) to a reception (Rx) antenna (i) is denoted by $h_{ij}$. In this case, it should be noted that the index order of the channel $h_{ij}$ is located before a reception (Rx) antenna index and is located after a transmission (Tx) antenna index.

Several channels are tied up, so that they are displayed in the form of a vector or matrix. An exemplary vector is as follows. FIG. 2 shows channels from $N_T$ transmission (Tx) antennas to a reception (Rx) antenna (i).

Referring to FIG. 2, the channels passing the range from the $N_T$ transmission (Tx) antennas to the reception (Rx) antenna (i) can be represented by the following equation 7.

$$h_i^T = [h_{i1}, h_{i2}, \ldots, h_{iN_T}]$$

If all channels passing the range from the $N_T$ transmission (Tx) antennas to $N_R$ reception (Rx) antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Additive white Gaussian noise (AWGN) is added to an actual channel which has passed the channel matrix (H) shown in Equation 8. The AWGN ($n_1, n_2, \ldots, n_{N_R}$) added to each of $N_R$ reception (Rx) antennas can be represented by a specific vector shown in the following equation 9.

$$n = [n_1, n_2, \ldots, n_{N_R}]^T$$ [Equation 9]

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} +$$ [Equation 10]

$$\begin{bmatrix} n_1 \\ n_2 \\ \vdots \\ n_i \\ \vdots \\ n_{N_R} \end{bmatrix} = Hx + n$$

The 3$^{rd}$ Generation Partnership Project (3GPP) supports a type 1 radio frame structure applicable to frequency division duplex (FDD), and a type 2 radio frame structure applicable to time division duplex (TDD).

The structure of a type 1 radio frame is shown in FIG. 3. The type 1 radio frame includes ten subframes, each of which consists of two slots.

The structure of a type 2 radio frame is shown in FIG. 4. The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform an initial cell search, synchronization, or channel estimation. UpPTS is used to perform channel estimation of a base station and uplink transmission synchronization of a user equipment (UE). The guard interval (GP) is located between an uplink and a downlink so as to remove an interference generated in the uplink due to a multi-path delay of a downlink signal. That is, one subframe is composed of two slots irrespective of the radio frame type.

FIG. 5 is a slot structure of a long term evolution (LTE) downlink. As shown in FIG. 5, a signal transmitted from each slot can be described by a resource grid including $N_{RB}^{DL}$ $N_{SC}^{RB}$ subcarriers and $N_{symb}^{DL}$ orthogonal frequency division multiplexing (OFDM) symbols. In this case, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot.

FIG. 6 is a slot structure of a long term evolution (LTE) uplink. As shown in FIG. 6, a signal transmitted from each slot can be described by a resource grid including $N_{RB}^{UL}$ $N_{SC}^{RB}$ subcarriers and $N_{symb}^{UL}$ OFDM symbols. In this case, $N_{RB}^{UL}$ represents the number of resource blocks (RBs) in an uplink, $N_{SC}^{RB}$ represents the number of subcarriers constituting one RB, and $N_{symb}^{UL}$ represents the number of OFDM symbols in one uplink slot.

A resource element (RE) is a resource unit defined by an index (a, b) within the uplink slot and the downlink slot, and represents one subcarrier and one OFDM symbol. In this case, a is an index on a frequency axis, and b is an index on a time axis.

4) Definition of Reference Signal

When a mobile communication system transmits a packet, this transmission packet is transmitted over a radio frequency (RF) channel. As a result, an unexpected distortion may occur in a transmission (Tx) signal. In order to correctly receive the distorted signal described above at a reception end, channel information must be recognized, and the distortion of the transmission (Tx) signal must be corrected by an amount of the channel information. In order to recognize channel information, signals known to both a transmission end and a reception end are transmitted, the degree of distortion of the known signals is detected when the known signals are received over a channel, and finally channel information is recognized on the basis of the detected distortion.

Here, the above signals known to both the transmission end and the reception end are referred to as pilot signals or reference signals.

In recent times, most mobile communication systems use a method for improving Tx/Rx data efficiency using multiple transmission (Tx) antennas and multiple reception (Rx) antennas to transmit a packet, instead of a conventional method of using one transmission (Tx) antenna and one reception (Rx) antenna to transmit a packet. When a transmission end or a reception end of a mobile communication system transmits or receives data using multiple antennas so as to increase capacity or improve a performance or throughput, additional reference signals are present in individual transmission (Tx) antennas, respectively. Signal reception can be correctly carried out under the condition that a channel condition between each Tx antenna and each Rx antenna is recognized.

Provided that M (where M>N) transmission (Tx) antennas can be added to a conventional system including N antennas, a user equipment (hereinafter referred to as a UE) capable of recognizing up to N transmission (Tx) antennas and another UE capable of recognizing up to M transmission (Tx) antennas exist at the same time.

In this case, not only reference signals for supporting N antennas but also M-N additional reference signals must be transmitted. Here, there is a need to effectively transmit data and reference signals under an environment in which a new UE for recognizing M antennas is additionally used without performing additional signaling with an old UE for recognizing only N antennas.

DISCLOSURE

Technical Problem

Accordingly, the present invention is directed to a method for transmitting a reference signal in a downlink MIMO system that substantially obviates one or more problems due to limitations and disadvantages of the related art.

An object of the present invention is to provide a method for effectively transmitting data and a reference signal under an environment in which a UE capable of supporting N transmission (Tx) antennas and another UE capable of supporting M reception (Rx) antennas simultaneously exist.

Technical Solution

To achieve these objects and other advantages and in accordance with the purpose of the invention, as embodied and broadly described herein, a method for transmitting a reference signal for channel measurement in a downlink Multiple Input Multiple Output (MIMO) system which supports a first user equipment (UE) supporting N transmission antennas among a total of M transmission antennas (where M>N) and a second user equipment (UE) supporting the M transmission antennas includes: transmitting, by a base station (BS), subframe-associated information which designates a first subframe in which data for the first UE and the second UE is transmitted and a second subframe in which data only for the second UE can be transmitted within a radio frame having a plurality of subframes; and transmitting the first subframe and the second subframe, wherein reference signals corresponding to antenna ports '0' to 'N-1' of the N antennas are mapped to the first subframe, and reference signals corresponding to antenna ports '0' to 'M-1' of the M antennas are mapped to the second subframe.

In another aspect of the present invention, a base station (BS) for use in a downlink Multiple Input Multiple Output (MIMO) system which supports a first user equipment (UE) supporting N transmission antennas among a total of M transmission antennas (where M>N) and a second user equipment (UE) supporting the M transmission antennas includes: a processing unit for generating subframe-associated information which designates a first subframe in which data for the first UE and the second UE can be transmitted and a second subframe in which data only for the second UE can be transmitted within a radio frame having a plurality of subframes; and a transmitter for transmitting the subframe-associated information, the first subframe, and the second subframe, wherein reference signals corresponding to antenna ports '0' to 'N-1' of the N antennas are mapped to the first subframe, and reference signals corresponding to antenna ports '0' to 'M-1' of the M antennas are mapped to the second subframe.

Positions of reference signals corresponding to antenna ports '0' to 'N-1' among the M antennas in the second subframe may be equal to those of the reference signals corresponding to the antenna ports '0' to 'N-1' among the N antennas in the first subframe.

The second subframe may include a plurality of orthogonal frequency division multiplexing (OFDM) symbols, a first portion of the OFDM symbols is for transmitting control information, a second portion of the OFDM symbols is for transmitting data, and reference signals corresponding to antenna ports 'N' to 'M-1' among the M antennas may be mapped to the second portion.

In the subframe-associated information, the second subframe may be designated as a multicast broadcast single frequency network (MBSFN) subframe.

In a further aspect of the present invention, a method for transmitting a reference signal for channel measurement in a downlink Multiple Input Multiple Output (MIMO) system includes: transmitting, by a base station (BS), subframe-associated information which designates a first subframe in which N reference signals are transmitted and a second subframe M reference signals (where M>N) within a radio frame; and transmitting the first subframe and the second subframe, wherein reference signals corresponding to antenna ports '0' to 'N-1' among the N antennas are mapped to the first subframe, and reference signals corresponding to antenna ports '0' to 'M-1' among the M antennas are mapped to the second subframe.

In a further aspect of the present invention, a base station (BS) for use in a downlink Multiple Input Multiple Output (MIMO) system includes: a processing unit for generating subframe-associated information which designates a first subframe in which N reference signals are transmitted and a second subframe M reference signals (where M>N) within a radio frame; and a transmitter for transmitting the subframe-associated information, the first subframe, and the second subframe, wherein reference signals corresponding to antenna ports '0' to 'N-1' of the N antennas are mapped to the first subframe, and reference signals corresponding to antenna ports '0' to 'M-1' of the M antennas are mapped to the second subframe.

Positions of reference signals corresponding to antenna ports 'N' to 'M−1' among the M antennas in the second subframe may be equal to those of the reference signals corresponding to the antenna ports '0' to 'N−1' of the N antennas in the first subframe.

Advantageous Effects

According to embodiments of the present invention, it is possible to effectively transmit data and a reference signal under an environment in which one UE for supporting N transmission (Tx) antennas and another UE for supporting M transmission (Tx) antennas simultaneously exist in a downlink MIMO system.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. Also, wherever possible, the same reference numbers will be used throughout the drawings to refer to the same or like parts.

In the case where M−N reference signals are additionally transmitted to support M (where M>N) antennas under an environment in which N reference signals are transmitted to support N transmission (Tx) antennas (hereinafter referred to simply as 'antennas'), it is difficult to define a new additional signaling for informing the user equipment (UE), which recognizes only N antennas operating in a conventional system, of the above-mentioned case representing additional transmission of the M−N reference signals. Therefore, the UE capable of recognizing only N antennas is unable to recognize transmission of M reference signals, so that an unexpected problem occurs in transmission and reception of data.

In order to solve the above-mentioned problem, the present invention proposes a method for dividing a radio frame into one transmission interval for supporting only N antennas and another transmission interval for supporting up to M antennas in addition to the N antennas.

Because the UE capable of recognizing only N antennas has difficulty in newly defining additional signaling in a transmission interval, the present invention provides a method for enabling a base station (BS) to restrict UEs capable of recognizing only N antennas so as to transmit data to only the transmission interval supporting only the N antennas.

In addition, the present invention provides a method for signaling information about a transmission interval supporting N antennas and a transmission interval supporting M antennas to a UE capable of recognizing up to M antennas. Thus, the UE capable of recognizing up to M antennas can transmit data in any one of the transmission intervals (the transmission interval supporting N antennas and the transmission interval supporting M antennas).

Figure 1:
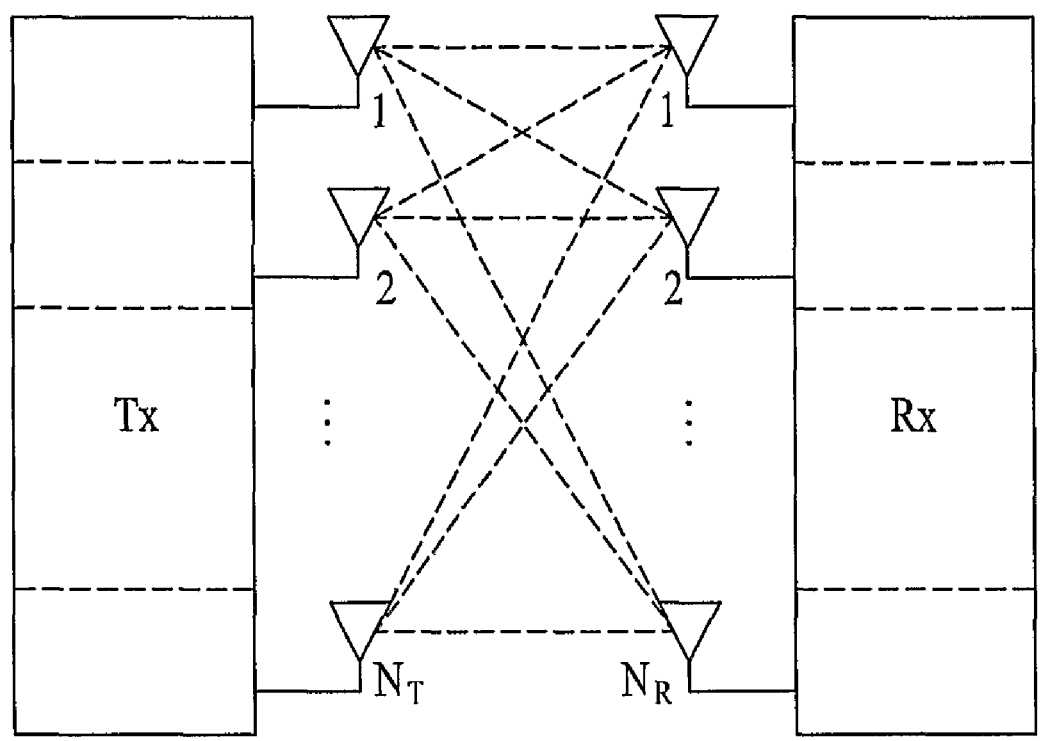
FIG. 1 is a block diagram illustrating a general MIMO communication system.
Figure 2:
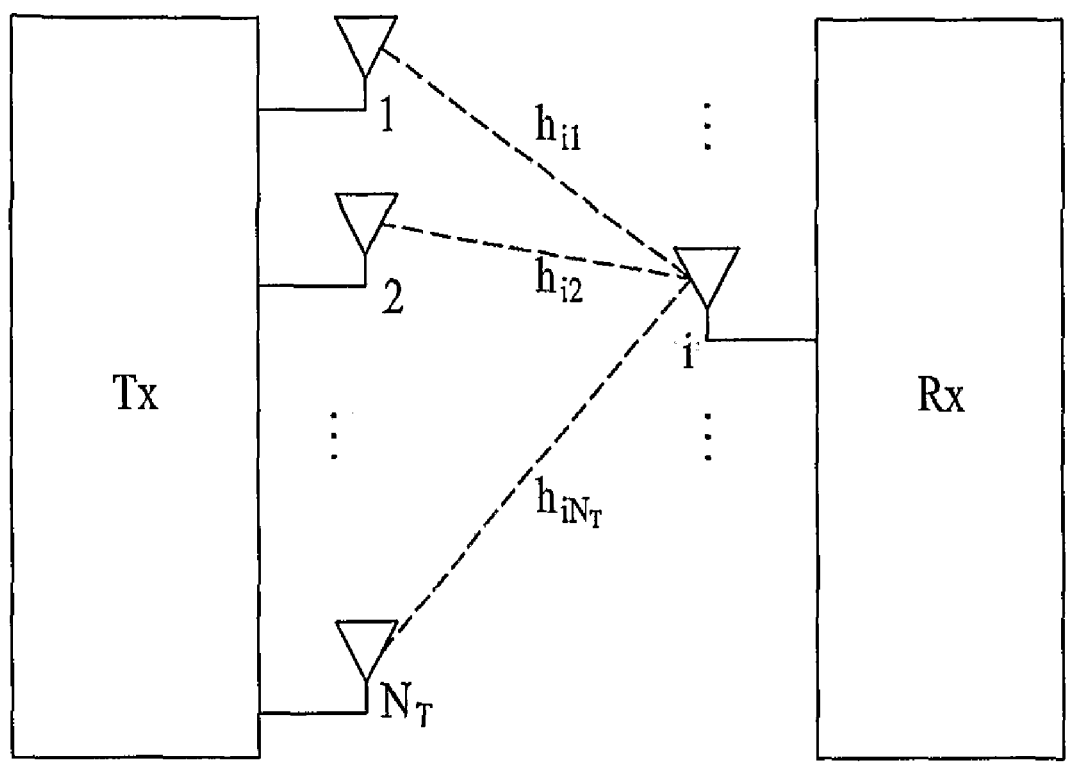
FIG. 2 shows channels from $N_T$ transmission (Tx) antennas to a reception (Rx) antenna (i).
Figure 3:
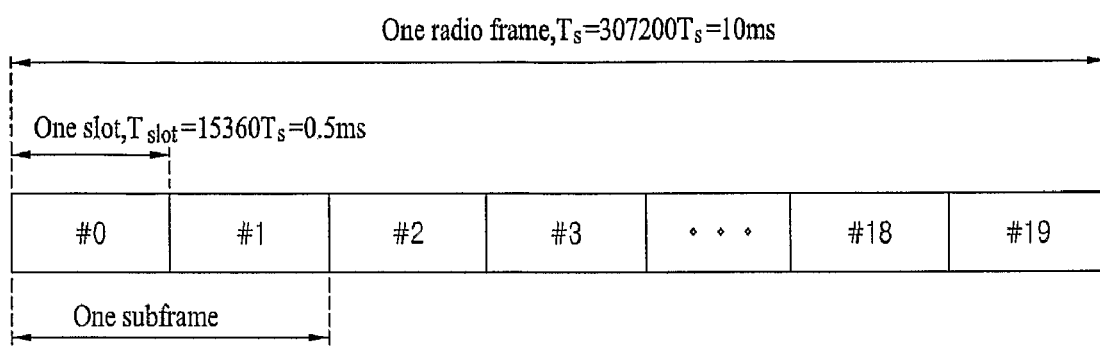
FIG. 3 is a structure of a type 1 radio frame.
Figure 4:
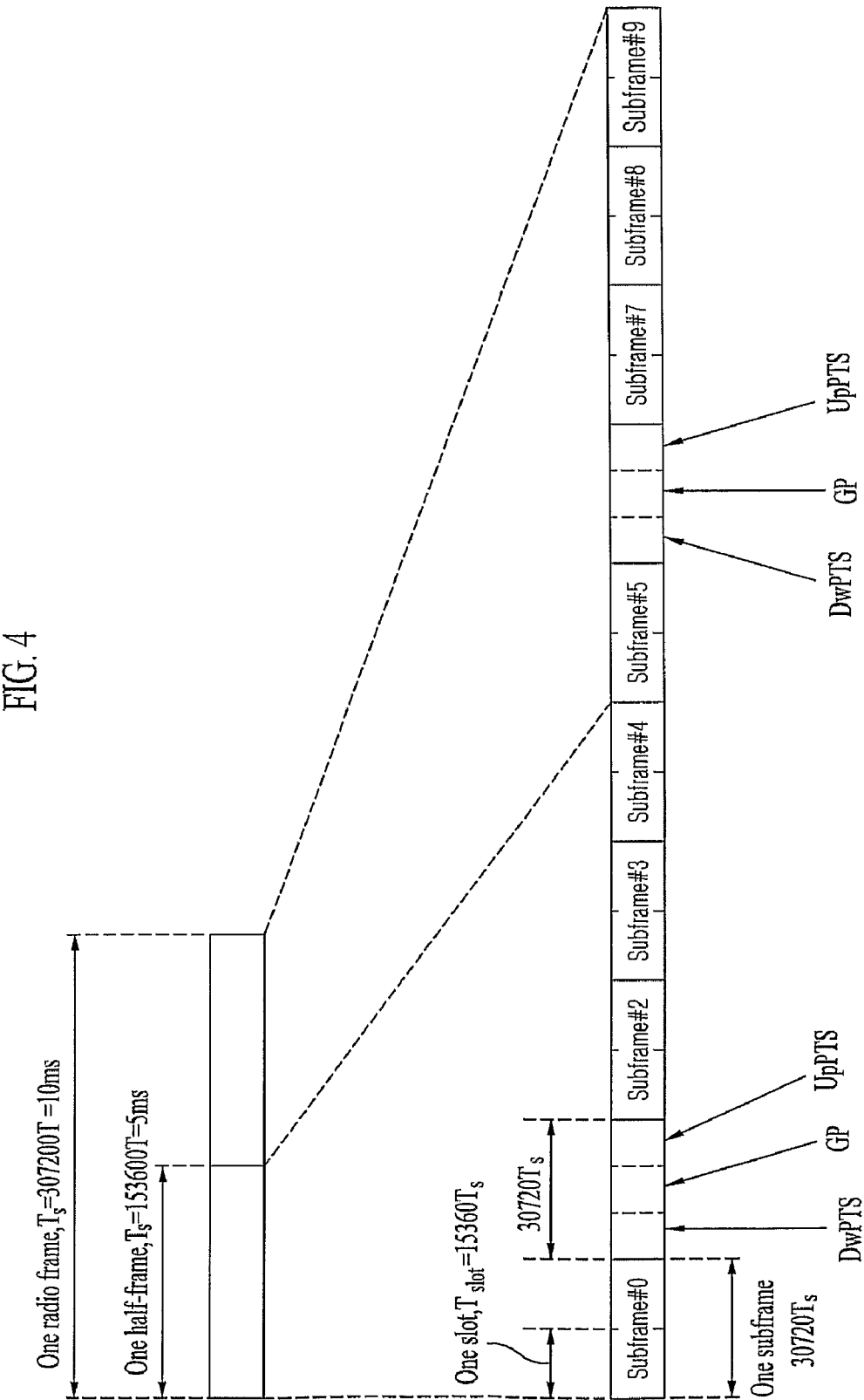
FIG. 4 is a structure of a type 2 radio frame.
Figure 5:
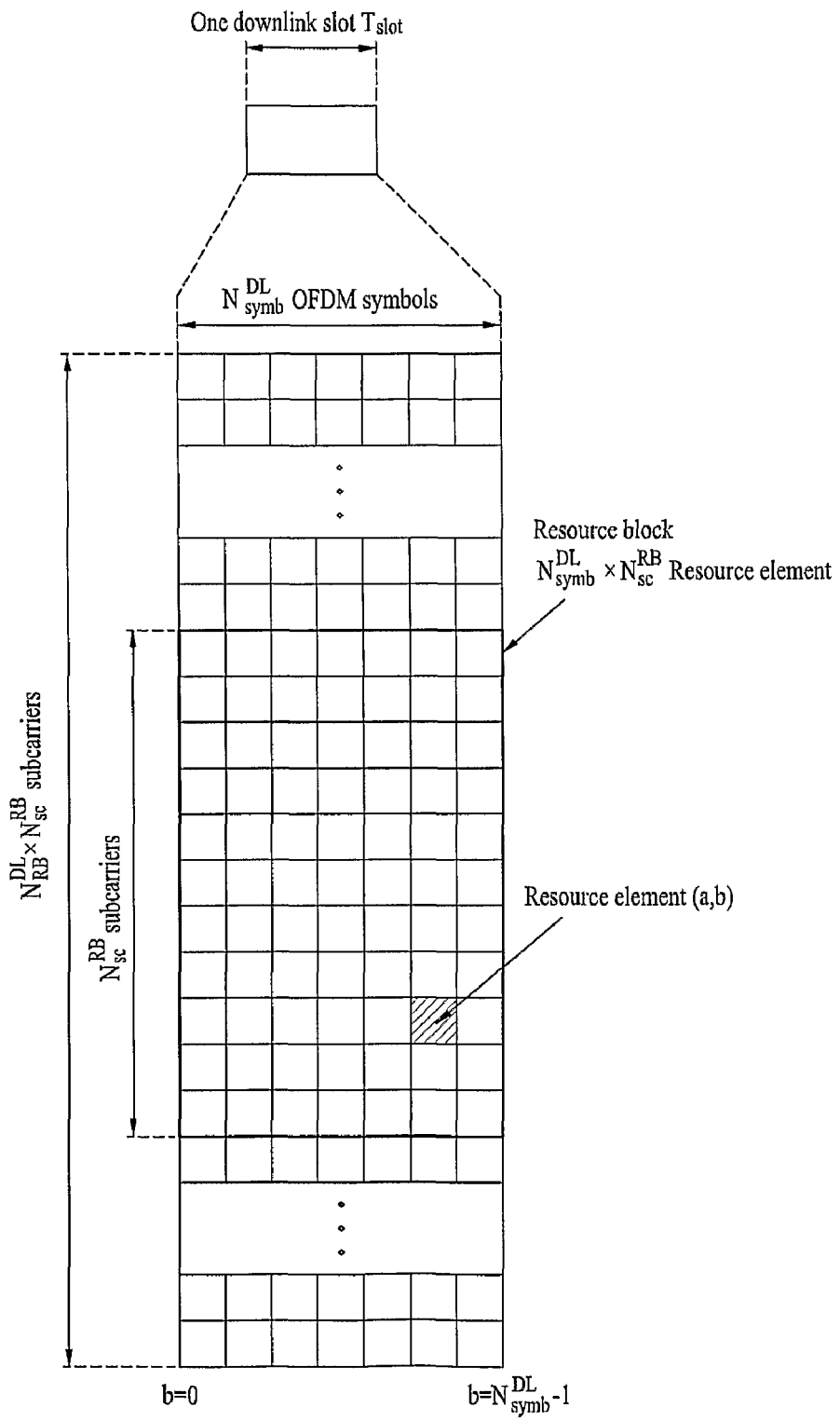
FIG. 5 is a slot structure of an LTE downlink.
Figure 6:
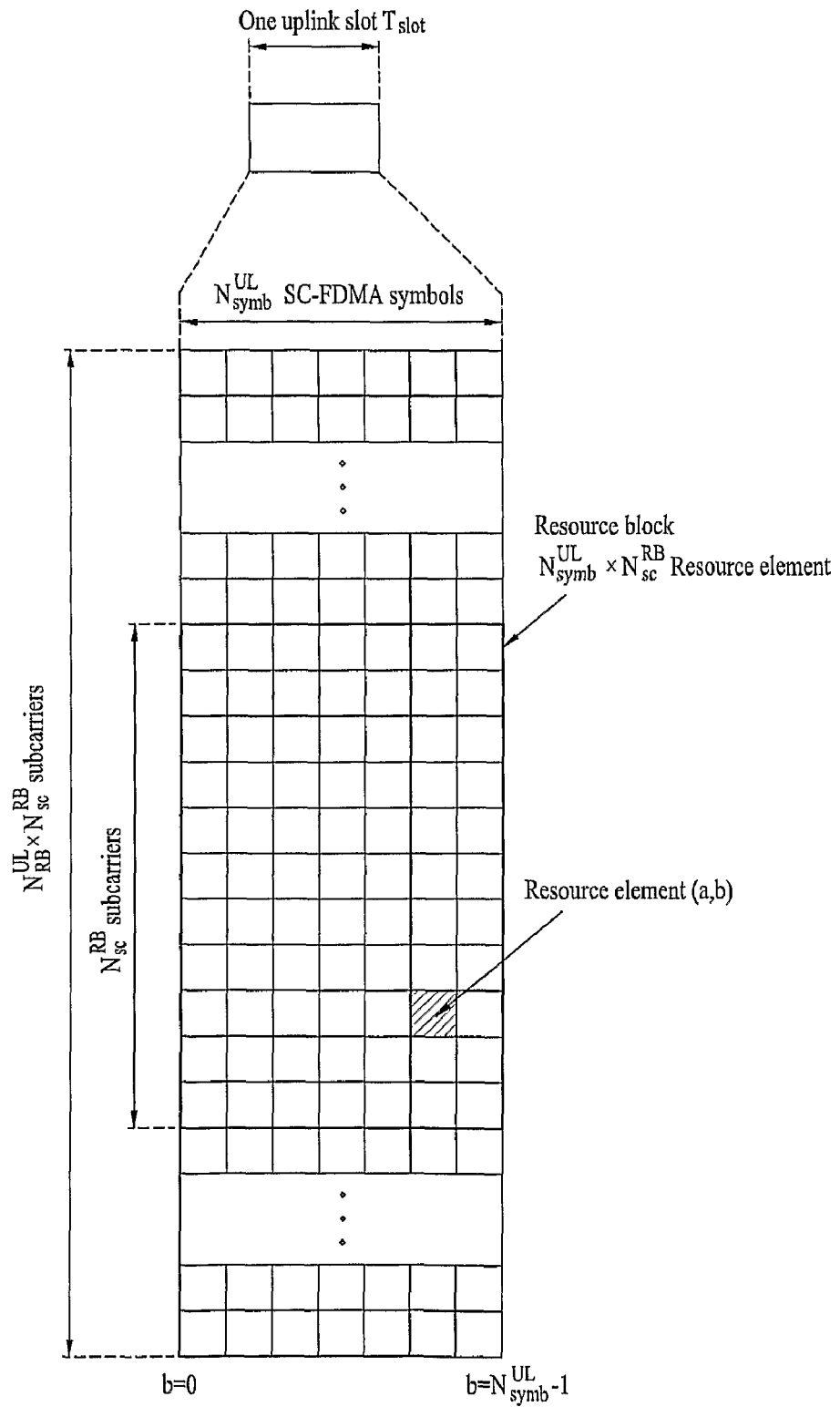
FIG. 6 is a slot structure of an LTE uplink.
Figure 7:
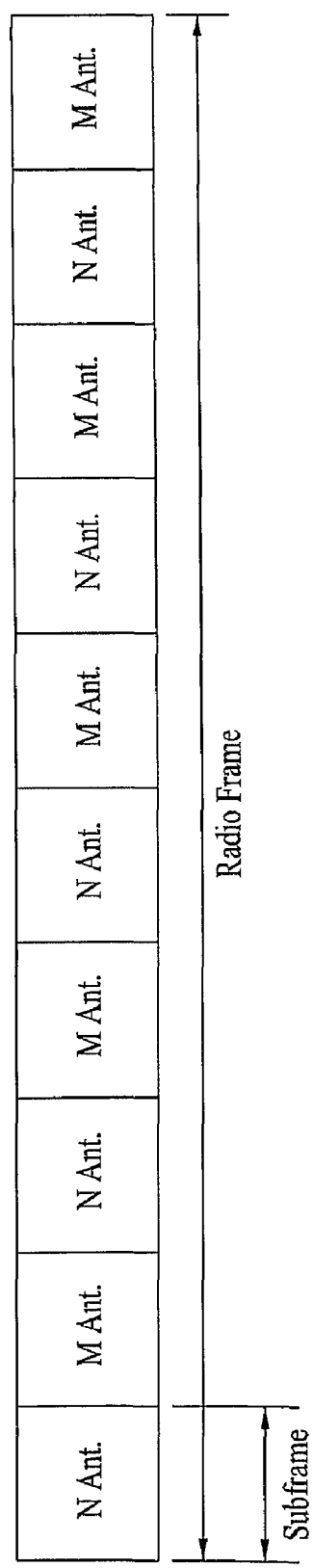
FIG. 7 is a structure of a radio frame according to an exemplary embodiment of the present invention.

FIG. 7 is a structure of a radio frame according to an exemplary embodiment of the present invention. In FIG. 7, a radio frame may be a frequency divisional duplex (FDD) radio frame. As can be seen from FIG. 7, a transmission interval of the radio frame is divided into a plurality of subframes, each of which supports a maximum of N antennas, and a plurality of other subframes, each of which supports a maximum of M antennas. An overall data transmission interval defined by a radio frame includes 10 transmission intervals, each of which is defined by a subframe. FIG. 7 is an example of a method for distinguishing one subframe for supporting N antennas from another subframe for supporting M antennas. The subframe for supporting N antennas and the other subframe for supporting M antennas may be dynamically or semi-statically changed.

In this case, a UE capable of recognizing only N antennas is unable to recognize the presence of M−N additional reference signals in a subframe capable of supporting M antennas, so that there is a need to perform scheduling restriction so as to prevent the UE recognizing only N antennas from receiving data in the subframe. The other UE recognizing M antennas is able to receive data in a subframe supporting N antennas. In this case, because information of one transmission interval for supporting N antennas and information of another transmission interval for supporting M antennas are signaled to the UE recognizing M antennas, although the UE recognizing M antennas receives data in the transmission interval supporting N antennas, channel information of M−N additional antennas can be recognized from a neighboring subframe supporting M antennas.

In this case, in order to support M antennas in a specific subframe, the present invention proposes a method for transmitting additional M−N reference signals in addition to reference signals for supporting N antennas.

For convenience of description and better understanding of the present invention, a 3rd Generation Partnership Project (3GPP) Long Term Evolution (LTE) system may be exemplarily used as a first system for supporting the UE recognizing only N antennas, and a LTE-A system may be exemplarily used as a second system for supporting the other UE recognizing M antennas, and a detailed description thereof will be given below with reference to the accompanying drawings.

Figure 8:
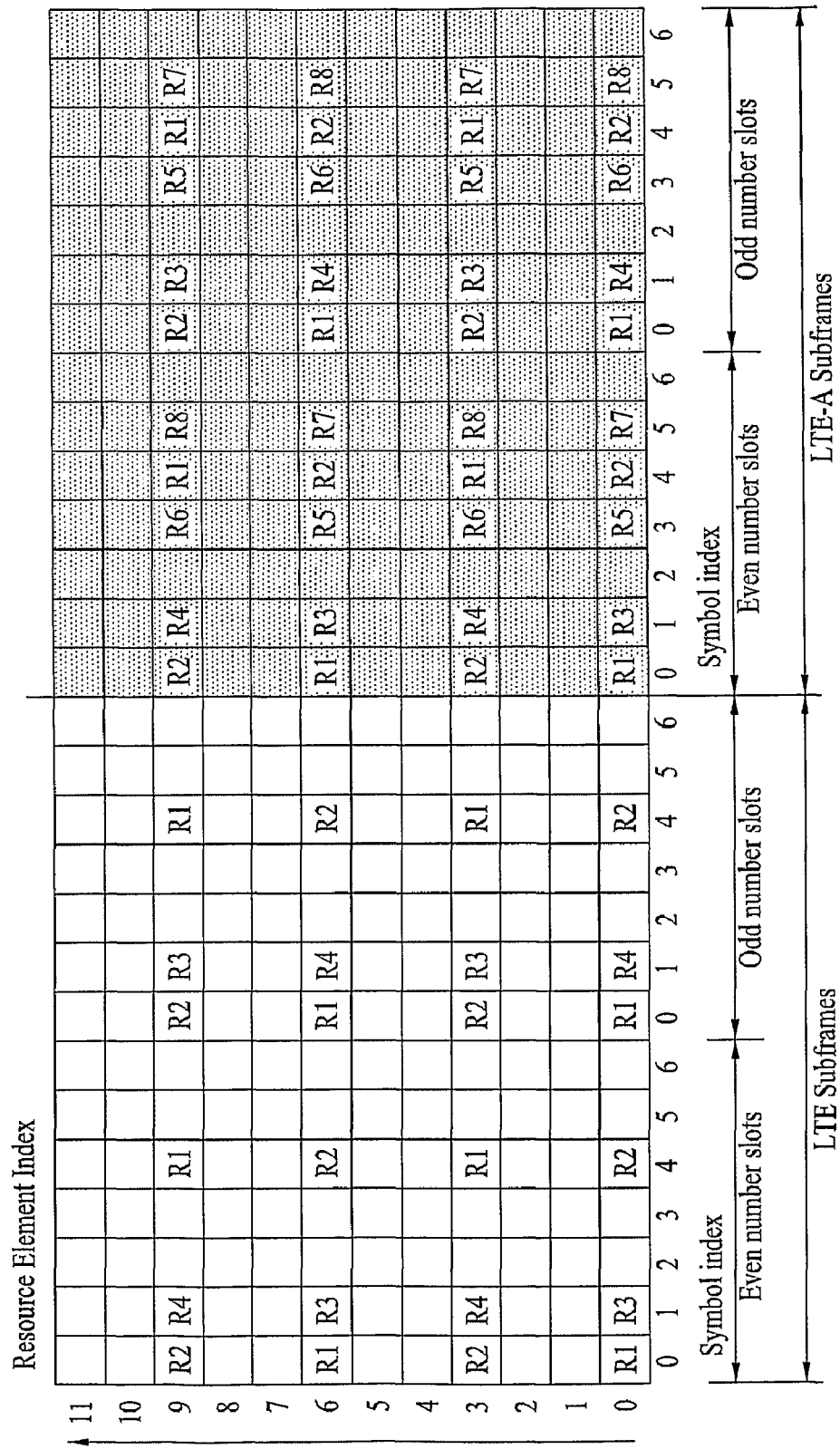
FIG. 8 is a structure of a subframe for supporting 8 antennas according to an exemplary embodiment of the present invention.

FIG. 8 is a structure of a subframe for supporting 8 antennas according to an exemplary embodiment of the present invention. As shown in FIG. 8, four reference signals (R1 to R4) for respectively supporting four antennas (Ant1 to Ant4) are transmitted in a subframe of the LTE system, and four reference signals (R5 to R8) in addition to conventional reference signals (R1 to R4) can be transmitted in subframes of the LTE-A system so as to support eight antennas (Ant1 to Ant8).

In the case where data for a UE capable of recognizing only four antennas is transmitted in a subframe in which eight reference signals (R1 to R8) are transmitted, the UE is unable to recognize transmission of other reference signals (R5 to R8), so that the UE regards the reference signals (R5 to R8) as data transmitted to the UE. As a result, the UE demodulates the reference signals (R5 to R8) and decodes the demodulated reference signals. In this case, transmission performance may be deteriorated due to reception of incorrect information. Accordingly, data for the UE capable of recognizing only four antennas should not be allocated to a subframe in which eight reference signals (R1 to R8) are transmitted.

In contrast, in case of another UE capable of recognizing eight antennas, although data is transmitted in a subframe in which only four reference signals (R1 to R4) are transmitted through four or more antennas, the UE can obtain channel information of the remaining four antennas (Ant5 to Ant8) in addition to other channel information recognized on the basis of the four reference signals (R1 to R4) from a neighboring subframe supporting 8 antennas.

In this case, a first to a third OFDM symbols (OFDM symbol index 0 to OFDM symbol index 2) of each subframe are used to transmit a channel (i.e., a control channel) containing control information. It is prescribed that a maximum of four antennas can be used within an interval in which the above control channel is used, so that all UEs can receive the control channel irrespective of the number of recognizable antennas.

If the number of symbols transmitting the control channel is deficient, a fourth OFDM symbol may also be used to transmit the control channel. Here, when transmitting reference signals using the structure shown in FIG. 8, UEs supporting four antennas are unable to recognize two reference signals R5 and R6 contained in the fourth OFDM symbol. To solve the above problem, in case that the first to the forth OFDM symbols are used for the control channel, new additional reference signals (R5 to R8) may be arranged from a fifth OFDM symbols.

Figure 9:
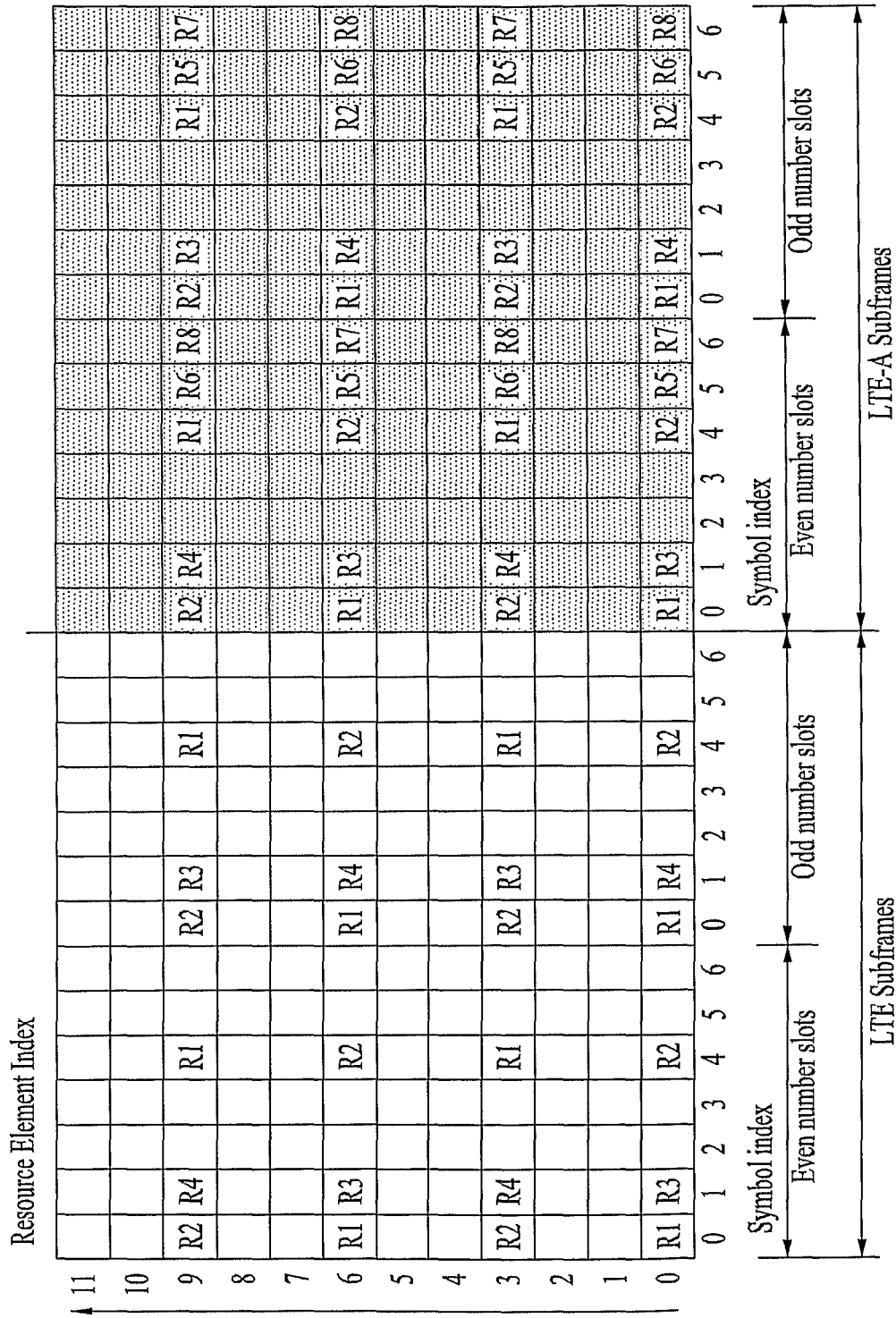
FIG. 9 is a structure of a subframe for supporting 8 antennas according to an exemplary embodiment of the present invention.

FIG. 9 is a structure of a subframe for supporting 8 antennas according to an exemplary embodiment of the present invention. As can be seen from FIG. 9, only four reference signals (R1 to R4) are transmitted in the first four OFDM symbols in a subframe in which eight reference signals (R1 to R8) are transmitted, so that all UEs can receive a control channel irrespective of the number of recognizable antennas. According to the above-mentioned structure for applying additional reference signals to N reference signals supporting N antennas, a performance or throughput of a UE recognizing only N antennas may be unexpectedly deteriorated as previously described above. Accordingly, it is undesirable that data for the UE recognizing only N antennas be transmitted in the subframe supporting M antennas, but the UE recognizing N antennas can use channel information in the subframe supporting M antennas.

The subframe supporting M antennas includes reference signals for supporting N antennas, so that it is possible to perform interpolation or averaging of channel information between subframes supporting N antennas. FIGS. 8 and 9 exemplarily show a method for transmitting additional four reference signals (R5 to R8) so as to support a maximum of eight reference signals in a conventional subframe structure in which a maximum of four reference signals (R1 to R4) are transmitted. In this case, the number of used reference signals is disclosed only for illustrative purposes, and embodiments of the present invention can also be applied to other variables N and M (where M>N). In addition, in case of additionally-transmitted reference signals differently from conventional reference signals, embodiments of the present invention propose a CDM-based transmission method between the additionally-transmitted reference signals. In case of using the CDM-based transmission method, many more reference signals can be transmitted using the same resources as those of the conventional reference signals, and resource consumption can be reduced due to the transmission of the same reference signals, so that the CDM-based transmission method can use resources more effectively than the conventional method.

However, in the case where additional reference signals are transmitted in addition to N conventional reference signals in the subframe supporting M antennas, much more resources are needed to transmit the additional reference signals, so that resources capable of being used to transmit data are relatively reduced. In order to solve the above problem, embodiments of the present invention propose a new method. According to this new method, all M reference signals supporting M antennas are transmitted in the subframe supporting M antennas. However, the M transmission reference signals are not transmitted using a conventional structure transmitting N conventional reference signals, but are transmitted using a new structure.

In case of transmitting M reference signals using the above new structure without being added to such a conventional structure, embodiments of the present invention can more effectively use time and frequency resources needed for transmitting reference signals. In addition, the present invention proposes a method for transmitting only M−N additional reference signals, instead of N conventional reference signals, in the subframe supporting M antennas. According to this proposed method, under the condition that there is no need to use the conventional structure for transmitting N reference signals without any change, an interval between reference signals may be adjusted on frequency and time axes of corresponding reference signals in consideration of not only the number of transmitted reference signals but also channel conditions to which additional reference signals are applied, and the total number of reference signals may also be adjusted.

Further, the present invention proposes another method. According to this method, the structure for use in the transmission of N reference signals is maintained without any change, reference signals of corresponding positions are replaced with new additional reference signals, and then the new additional reference signals can be transmitted.

Figure 10:
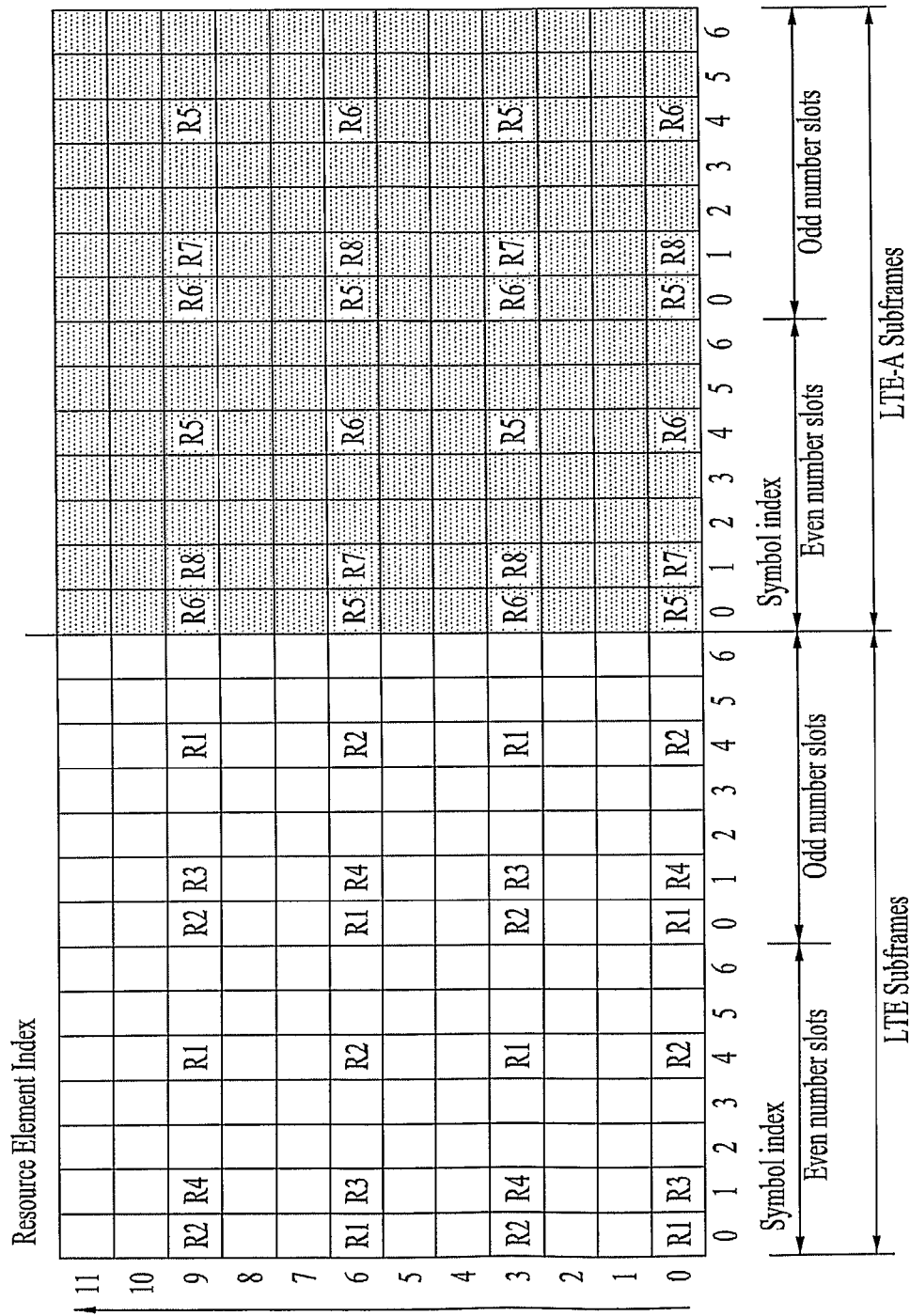
FIG. 10 is a structure of a subframe for supporting 8 antennas according to an exemplary embodiment of the present invention.

FIG. 10 is a structure of a subframe for supporting 8 antennas according to an exemplary embodiment of the present invention. As shown in FIG. 10, in a subframe supporting eight antennas, four new reference signals (R5 to R8) are transmitted on a specific position on which four conventional reference signals (R1 to R4) are transmitted. In this case, additional resources for transmitting additional reference signals (R5 to R8) need not be used for the above-mentioned transmission, so that resources can be effectively used. In this way, when using a method for transmitting additional reference signals in a specific subframe so as to support M antennas, specific information is signaled to a UE capable of recognizing the M antennas, where the specific information indicates which subframe is a subframe in which additional reference signals for supporting the M antennas are transmitted. Because the specific information is signaled to the UE capable of recognizing the M antennas, the UE can obtain channel information from any subframe based on the specific information. Thus, the system can be operated stably.

However, the UE capable of recognizing N conventional antennas is unable to recognize the above information. Accordingly, when channel information between subframes is interpolated or averaged, the UE may use incorrect channel information of the subframe in which additional reference signals are transmitted, instead of using information of another subframe transmitting N conventional reference signals, resulting in the occurrence of unexpected problems.

In order to solve the above-mentioned problems, the present invention proposes a signaling method for preventing a UE capable of recognizing only N antennas from receiving a subframe supporting M antennas. A variety of signaling methods may be used in the present invention. For example, the following four signaling methods (1)~(4) may be used in embodiments of the present invention, and a detailed description thereof will be given below.

1) First Signaling Method

The first signaling method is used to distinguish one subframe in which N reference signals are used, from another subframe in which N reference signals and additional reference signals are used or other reference signals for additional antenna ports are used.

2) Second Signaling Method

The second signaling method allows a UE capable of recognizing only N reference signals to use reference signals of a subframe supporting only N reference signals to which data is allocated, without using reference signals of a neighboring subframe supporting M antennas.

3) Third Signaling Method

The third signaling method allows a UE capable of recognizing only N reference signals to use channel information of a specific subframe supporting only the N reference signals, instead of using channel information of another subframe supporting M antennas, even though the data is not allocated to the specific subframe.

4) Fourth Signaling Method

Any one of known signaling methods may be exemplarily used for the UE recognizing only N antennas. For example, in the 3GPP LTE system, a base station (BS) may signal to UEs capable of recognizing a maximum of four antennas that specific subframe is a Multicast Broadcast Single Frequency Network (MBSFN) subframe.

The fourth signaling method (4) among the above-mentioned signaling methods will hereinafter be described in detail. If the 3GPP LTE system performs signaling with a corresponding UE so as to indicate the MBSFN subframe, this UE does not use channel information of the MBSFN subframe because it does not read a data part of the MBSFN subframe, and uses either only channel information of a subframe which the UE receives or only channel information of another subframe supporting four antennas, so that no problems occur in the system.

In other words, in order to control a UE recognizing only four antennas to recognize a subframe supporting 8 antennas as a MBSFN subframe, the base station (BS) can signal to the UE that the subframe supporting eight antennas is the MBSFN subframe.

Although the subframe supporting eight antennas is not actual MBSFN subframe, the UE recognizing only four antennas can recognize the subframe supporting eight antennas as the MBSFN subframe according to the signaling result of the fourth signaling method. In the meantime, if necessary, another additional signaling process may also be required for the UE recognizing eight antennas so as to recognize the subframe supporting eight antennas.

However, as previously mentioned above, the first one to three OFDM symbols of a subframe (or the first two to four OFDM symbols of a subframe in some cases) may be transmitted to transmit a channel (i.e., control channel) containing control information. Here, a transmission interval of the control channel may be defined as a specific transmission interval in which a maximum of four antennas can be used so that all UEs can receive the control channel regardless of the number of recognizable antennas. In case of transmitting reference signals as shown in FIG. 10, the UE recognizing four conventional antennas is unable to recognize new reference signals (R5 to R8), so that an unexpected problem occurs in reception of the control channel.

Accordingly, in order to solve the above-mentioned problem, embodiments of the present invention propose another method. According to this method, four conventional reference signals (R1 to R4) are transmitted in an interval through which the control channel is transmitted, and original reference signals (R1 to R4) are replaced with new reference signals (R5 to R8). The new reference signals (R5 to R8) are transmitted in an interval in which data is transmitted.

Figure 11:
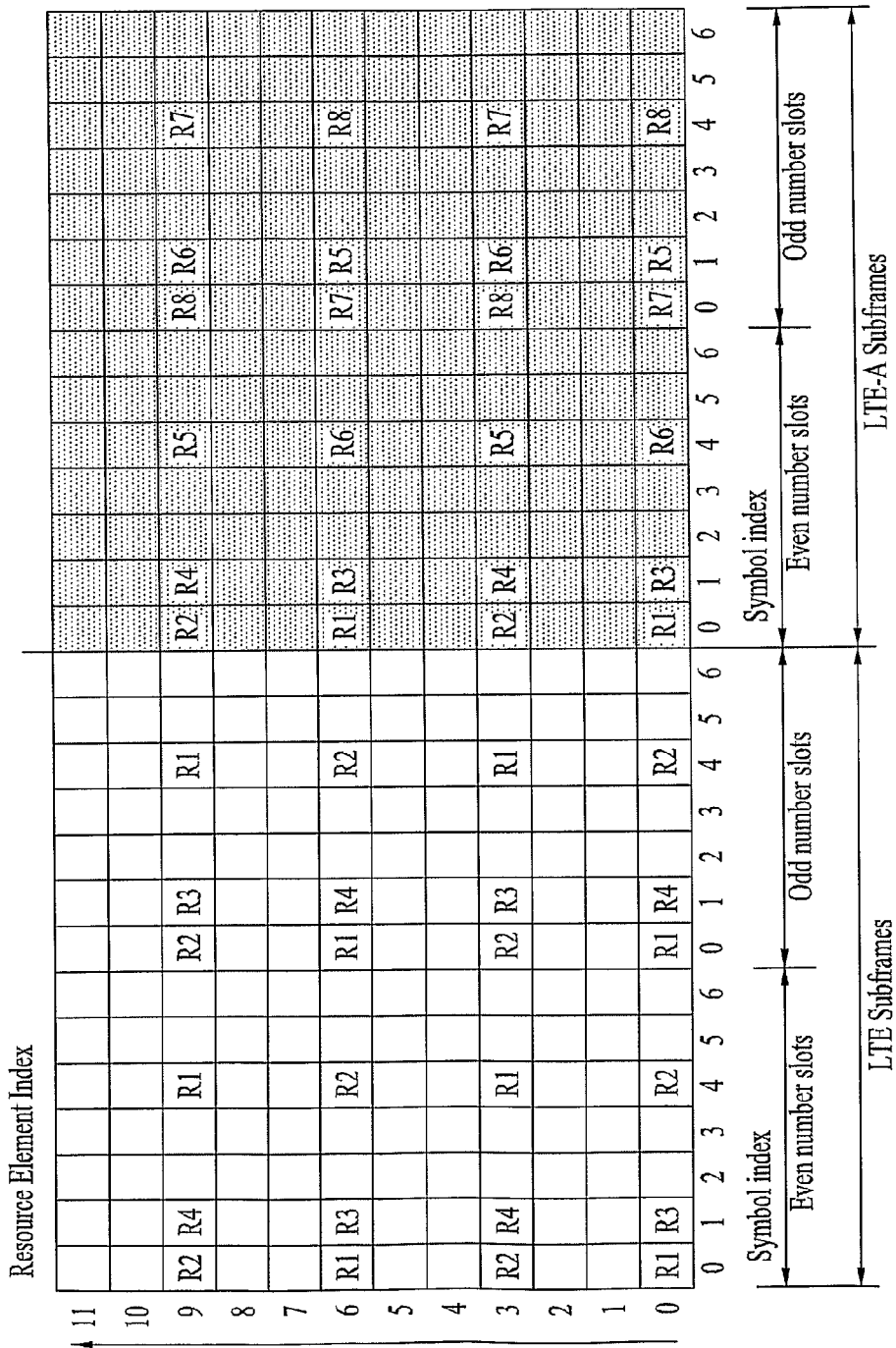
FIG. 11 is a structure of a subframe for supporting 8 antennas according to an exemplary embodiment of the present invention.

FIG. 11 is a structure of a subframe for supporting eight antennas according to an exemplary embodiment of the present invention.

As shown in FIG. 11, conventional reference signals (R1 to R4) may be transmitted in a first region (i.e., first and second OFDM symbol illustrated in FIG. 11) in which a control channel is transmitted, and the conventional reference signals (R1 to R4) are replaced with new reference signals (R5 to R8) in a second region in which data is transmitted, so that the resultant subframe composed of the conventional reference signals (R1 to R4) and the new reference signals (R5 to R8) may be transmitted. In this case, the present invention may use a specific signaling method for preventing a UE recognizing only N antennas from reading the second region.

In this way, if the above-mentioned signaling method prevents the UE capable of recognizing only the N antennas from reading the second region, there is no need to transmit the new reference signals to the same positions as those of the N reference signals, and the new reference signals can be transmitted to other positions where channel estimation capability may greatly increase.

Figure 12:
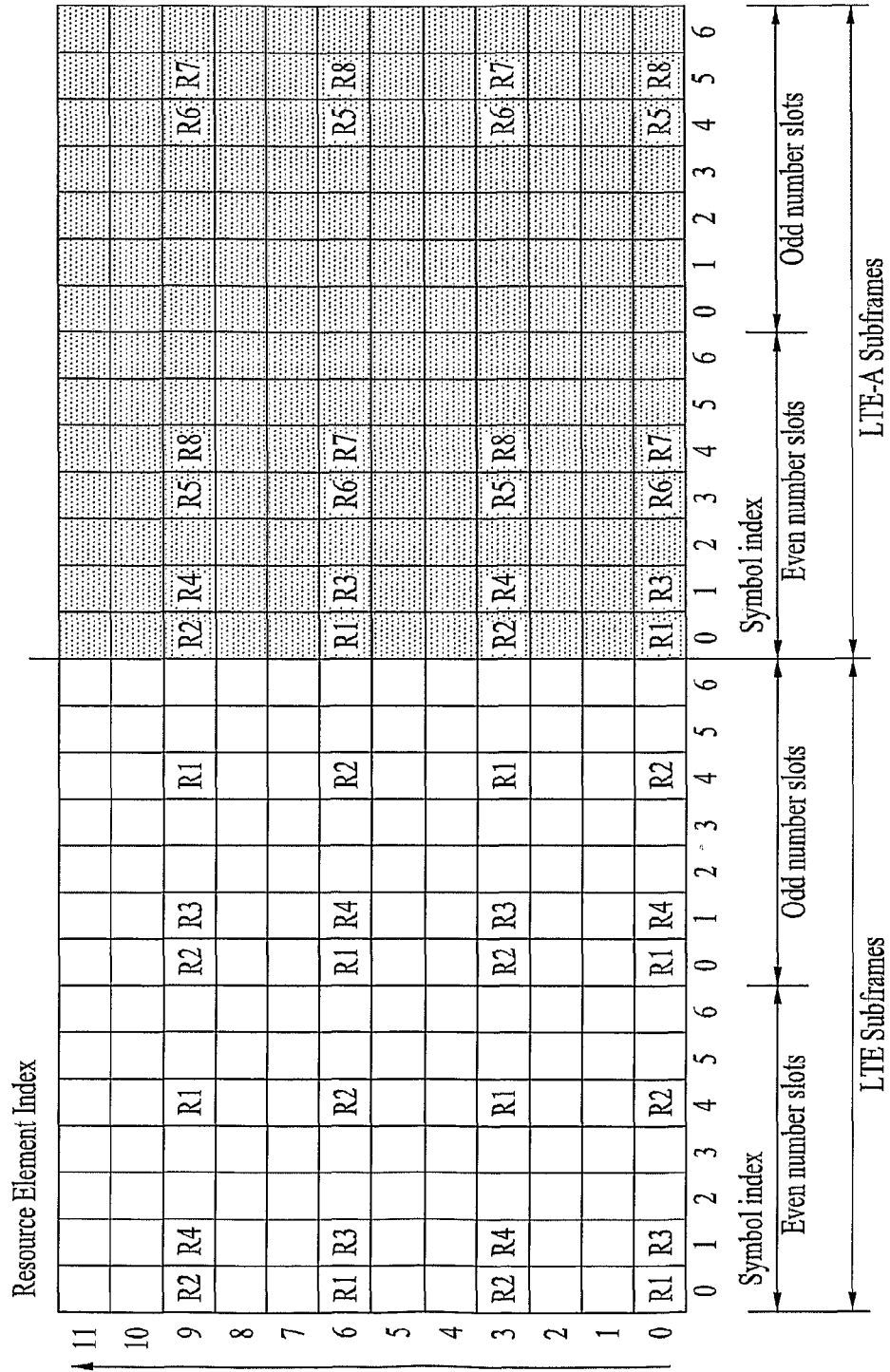
FIG. 12 is a structure of a subframe for supporting 8 antennas according to an exemplary embodiment of the present invention.

FIG. 12 is a structure of a subframe for supporting antennas according to an exemplary embodiment of the present invention. As shown in FIG. 12, transmission positions of new reference signals (R5 to R8) are changed to new positions instead of transmission positions of conventional reference signals (R1 to R4). In this way, a channel estimation performance can be improved by changing the positions of the reference signals. In order to support a maximum of 8 antennas in the subframe structure in which a maximum of four conventional reference signals are transmitted, FIGS. 10 to 12 exemplarily show methods for replacing four conventional reference signals (R1 to R4) with four new reference signals (R5 to R8) and then transmitting the replaced result. In this case, the number of used reference signals is disclosed only for illustrative purposes, and embodiments of the present invention may set the number of such reference signals to N and M (where M>N).

In the case of using new reference signals newly transmitted in the subframe supporting M antennas according to embodiments of the present invention, a Code Division Multiplexing (CDM)-based transmission method may be used between the newly-transmitted reference signals in a different way from conventional reference signals. In case of using the CDM-based transmission method, many more reference signals can be transmitted using the same resources as those of the conventional reference signals, an amount of used resources can be reduced when transmitting the same reference signals, so that the CDM-based transmission method can use resources more effectively than the conventional method.

Further, although the above-mentioned proposed methods have been disclosed to restrict UE allocation by classifying subframes into one subframe capable of supporting only N antennas and another subframe capable of supporting up to M antennas (where M>N) on a time axis, embodiments of the present invention propose a method for discriminating between reference signals on a frequency axis in a data region allocated to a UE recognizing a maximum of M antennas.

Figure 13:
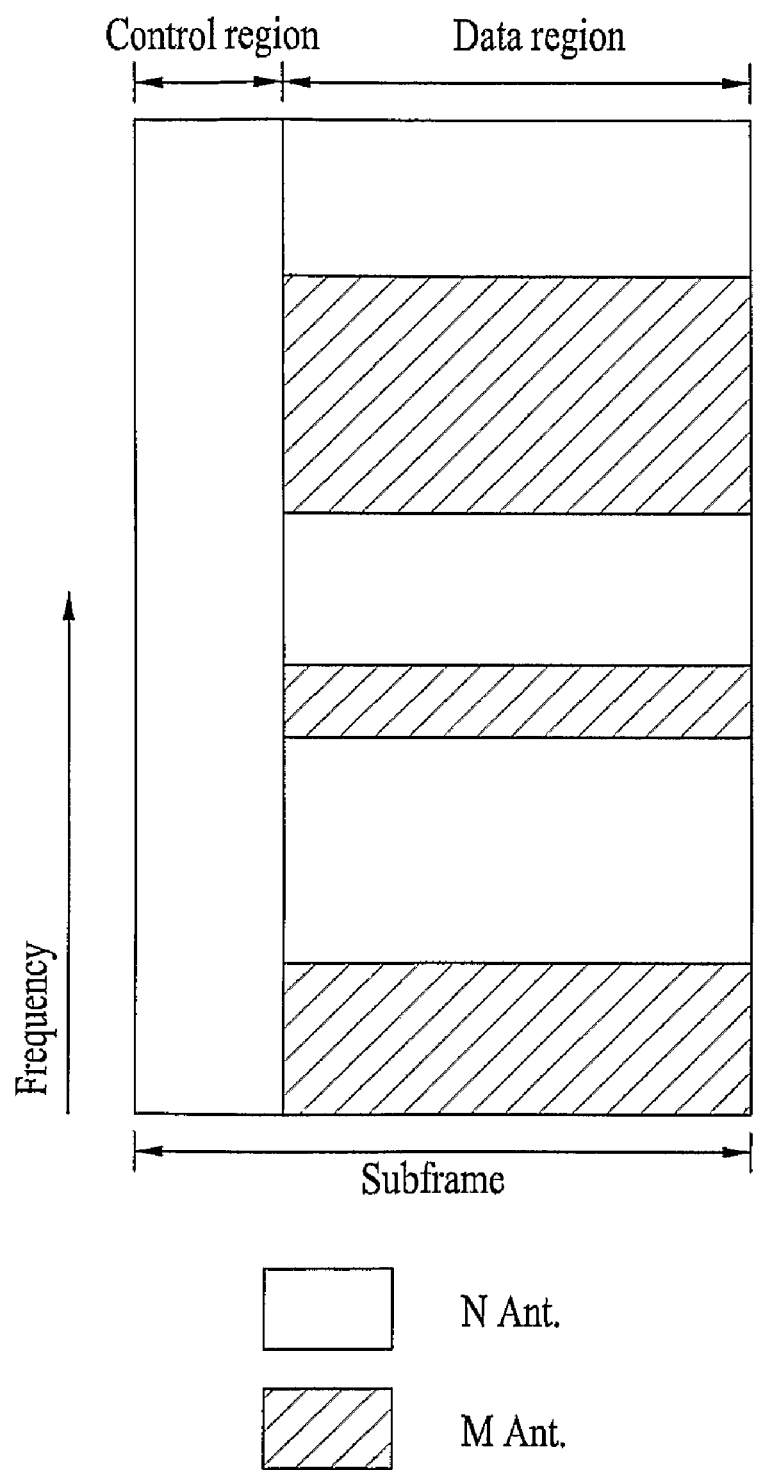
FIG. 13 is a structure of a subframe for discriminating between one region for supporting N antennas and another region for supporting M (M>N) antennas on the basis of a frequency axis according to an exemplary embodiment of the present invention.

FIG. 13 is a structure of a subframe for discriminating between one region for supporting N antennas and another region for supporting M (M>N) antennas on the basis of a frequency axis according to an exemplary embodiment of the present invention. As shown in FIG. 13, a control region may support only N antennas so as to allow all UEs to receive data irrespective of the number of recognizable antennas. A data region is divided into one data region allocated to one UE recognizing only N antennas and another data region allocated to another UE recognizing a maximum of M antennas, so that it can support different reference signals. In this case, the data region allocated to the UE recognizing only N antennas and the other data region allocated to the other UE recognizing a maximum of M antennas may be established in various formats.

In this case, in order to implement reference signals transmitted in the data region allocated to the UE recognizing a maximum of M antennas, the above described method that additional reference signals are added to the conventional N reference signals can be applied to the data region or the above described method that the conventional N reference signals are replaced with the additional reference signals can be applied to the data region.

As described above, in the case where the number of supportable antennas is classified only in the data region allocated to the UE capable of recognizing M antennas, and then reference signals are transmitted to this data region, resource allocation between UEs can be more effectively carried out.

Figure 14:
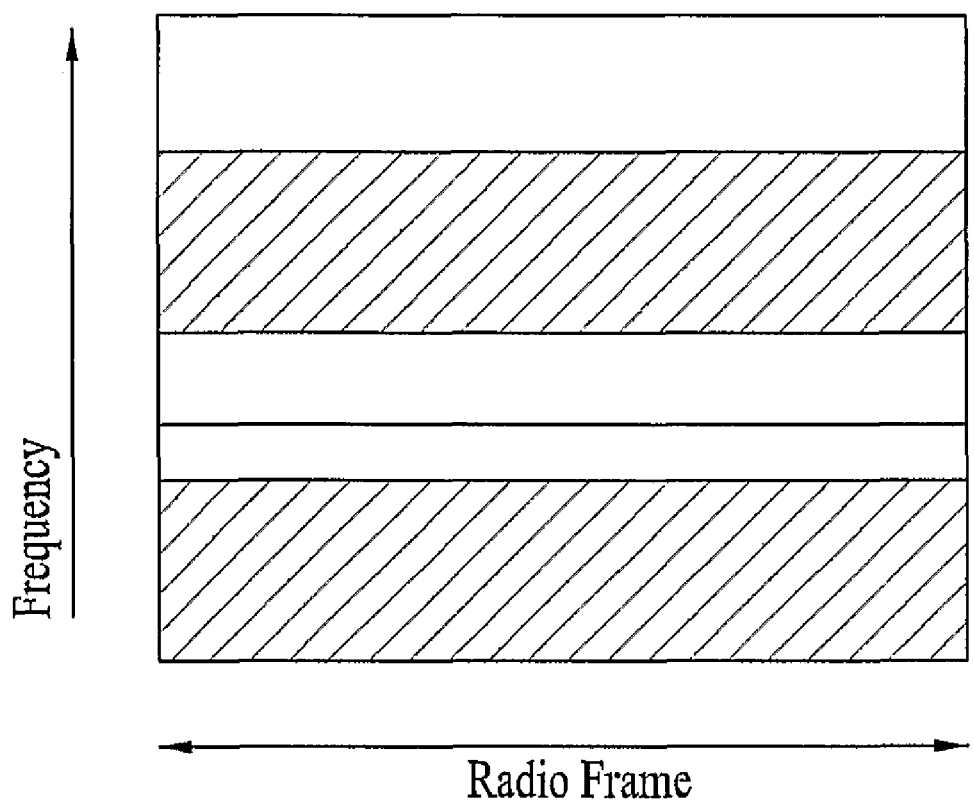
FIG. 14 is a structure of a radio frame that distinguishes one region for supporting N antennas from another region for supporting M (M>N) antennas on a frequency axis according to an exemplary embodiment of the present invention.
Figure 14:
Figure 14:

FIG. 14 is a structure of a radio frame that distinguishes one region for supporting N antennas from another region for supporting M (M>N) antennas on a frequency axis according to an exemplary embodiment of the present invention. Although one subframe has been exemplarily used in FIG. 13, as shown in FIG. 14, one radio frame may be divided into a data region allocated to one UE recognizing only N antennas and another data region allocated to another UE recognizing a maximum of M antennas in the direction of a frequency axis, and then the above-mentioned methods may be applied to such data region as necessary.

By the above-mentioned methods, a UE having received reference signals from a base station (BS) can generate channel information using the received reference signals, and can feed back the generated channel information to the base station (BS).

Figure 15:
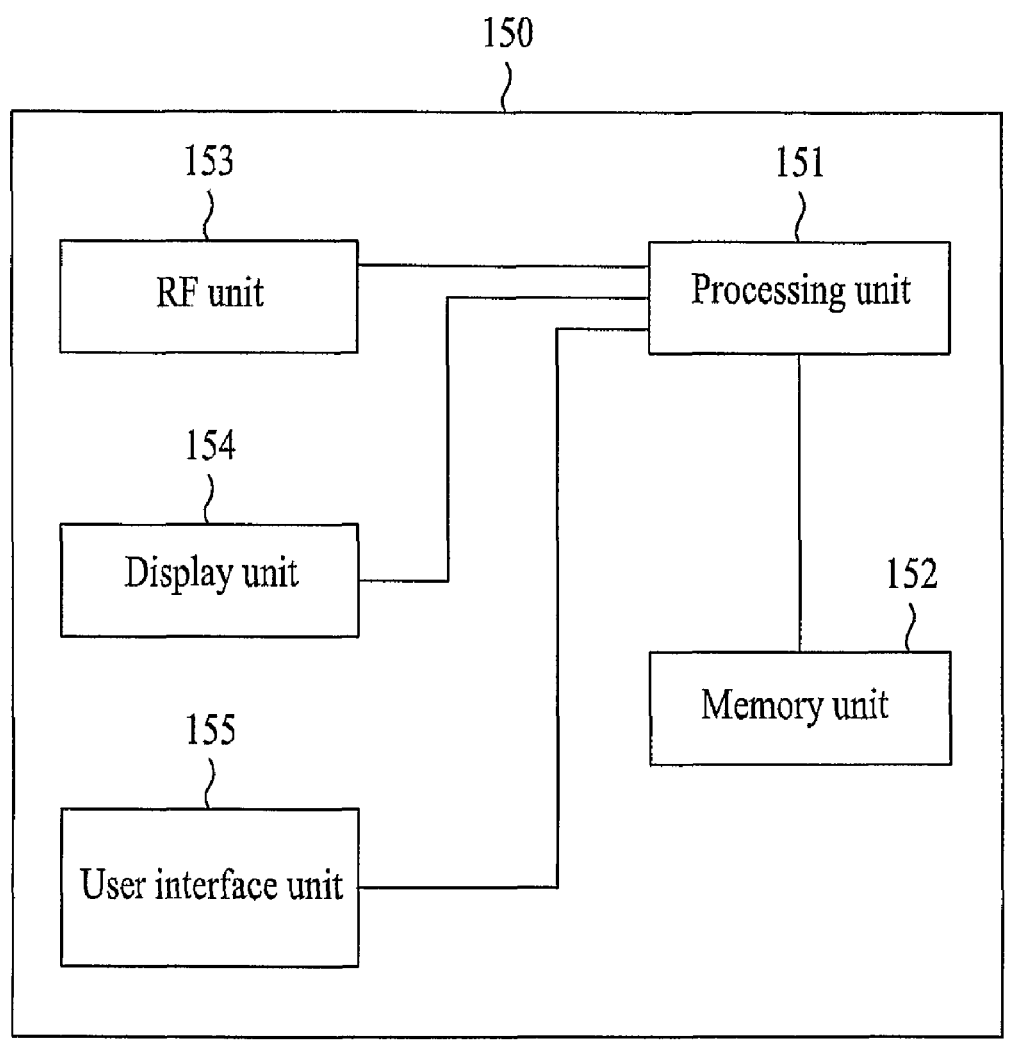
FIG. 15 is a block diagram of a device, which is applicable to a user equipment (UE) and a base station (BS) and is able to implement embodiments of the present invention.

FIG. 15 is a block diagram of a device, which is applicable to a user equipment (UE) or a base station (BS) and is able to implement embodiments of the present invention. Referring to FIG. 15, a device 150 includes a processing unit 151, a memory unit 152, a Radio Frequency (RF) unit 153, a display unit 154, and a user interface unit 155. The processing unit 151 handles physical interface protocol layers. The processing unit 151 provides a control plane and a user plane. The processing unit 151 may perform functions of each layer. The memory unit 152, which is electrically connected to the processing unit 151, stores an operating system, application programs, and general files. If the device 150 is a UE, the display unit 154 may display various pieces of information and be configured with a Liquid Crystal Display (LCD), an Organic Light Emitting Diode (OLED), etc. which are known in the art. The user interface unit 155 may be configured to be combined with a known user interface such as a keypad, a touch screen, or the like. The RF unit 153, which is electrically connected to the processing unit 151, transmits and receives radio signals.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is apparent that the present invention may be embodied by a combination of claims which do not have an explicit cited relation in the appended claims or may include new claims by amendment after application.

MODE FOR INVENTION

Various embodiments have been described in the best mode for carrying out the invention.

INDUSTRIAL APPLICABILITY

As apparent from the above description, embodiments of the present invention are applicable to a user equipment (UE), a base station (BS), or other devices of a wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a reference signal for channel measurement in a downlink Multiple Input Multiple Output (MIMO) system which supports a first user equipment (UE) supporting N transmission antennas among a total of M transmission antennas (where M>N) and a second user equipment (UE) supporting the M transmission antennas, the method comprising:
   transmitting, by a base station (BS), subframe-associated information which designates a first subframe in which data for the first UE and the second UE is transmitted and a second subframe in which data only for the second UE is transmitted within a radio frame having a plurality of subframes; and
   transmitting the first subframe and the second subframe,
   wherein reference signals corresponding to antenna ports '0' to 'N−1' of the N antennas are mapped to the first subframe, and reference signals corresponding to antenna ports '0' to 'M−1' of the M antennas are mapped to the second subframe.

2. The method according to claim 1, wherein positions of reference signals corresponding to antenna ports '0' to 'N−1' among the M antennas in the second subframe are equal to those of the reference signals corresponding to the antenna ports '0' to 'N−1' of the N antennas in first subframe.

3. The method according to claim 1, wherein the second subframe includes a plurality of orthogonal frequency division multiplexing (OFDM) symbols, a first portion of the OFDM symbols is for transmitting control information, a second portion of the OFDM symbols is for transmitting data, and reference signals corresponding to antenna ports 'N' to 'M−1' among the M antennas are mapped to the second portion.

4. The method according to claim 3, wherein, in the subframe-associated information, the second subframe is designated as a multicast broadcast single frequency network (MBSFN) subframe.

5. A method for transmitting a reference signal for channel measurement in a downlink Multiple Input Multiple Output (MIMO) system, the method comprising:
   transmitting, by a base station (BS), subframe-associated information which designates a first subframe in which N reference signals are transmitted and a second subframe M reference signals (where M>N) within a radio frame; and
   transmitting the first subframe and the second subframe,
   wherein reference signals corresponding to antenna ports '0' to 'N−1' among the N antennas are mapped to the first subframe, and reference signals corresponding to antenna ports '0' to 'M−1' among the M antennas are mapped to the second subframe.

6. The method according to claim 5, wherein positions of reference signals corresponding to antenna ports 'N' to 'M−1' in the second subframe are equal to those of the reference signals corresponding to the antenna ports '0' to 'N−1' of the N antennas in the first subframe.

7. A method for transmitting a reference signal for channel measurement in a downlink Multiple Input Multiple Output (MIMO) system which supports a first user equipment (UE) supporting N transmission antennas among a total of M transmission antennas (where M>N) and a second user equipment (UE) supporting the M transmission antennas, the method comprising:
   transmitting, by a base station (BS), region-associated information which discriminates, on a frequency axis within a radio frame, between a first region in which data for the first UE and the second UE is transmitted and a second region in which data only for the second UE is transmitted; and
   transmitting a subframe contained in the radio frame to the first UE and the second UE,
   wherein reference signals corresponding to antenna ports '0' to 'N−1' of the N antennas among the M antennas are mapped to the first region, and reference signals corresponding to antenna ports '0' to 'M−1' of the M antennas are mapped to the second region.

8. A base station (BS) for use in a downlink Multiple Input Multiple Output (MIMO) system which supports a first user equipment (UE) supporting N transmission antennas among a total of M transmission antennas (where M>N) and a second user equipment (UE) supporting the M transmission antennas, the base station (BS) comprising:
   a processing unit for generating subframe-associated information which designates a first subframe in which data for the first UE and the second UE can be transmitted and a second subframe in which data only for the second UE can be transmitted within a radio frame having a plurality of subframes; and
   a transmitter for transmitting the subframe-associated information, the first subframe, and the second subframe,
   wherein reference signals corresponding to antenna ports '0' to 'N−1' of the N antennas are mapped to the first subframe, and reference signals corresponding to antenna ports '0' to 'M−1' of the M antennas are mapped to the second subframe.

9. The base station (BS) according to claim 8, wherein positions of reference signals corresponding to antenna ports '0' to 'N−1' among the M antennas in the second subframe are equal to those of the reference signals corresponding to the antenna ports '0' to 'N−1' among the N antennas in the first subframe.

10. The base station (BS) according to claim 8, wherein the second subframe includes a plurality of orthogonal frequency division multiplexing (OFDM) symbols, a first portion of the OFDM symbols is for transmitting control information, second portion of the OFDM symbols is for transmitting data, and reference signals corresponding to antenna ports 'N' to 'M−1' among the M antennas are mapped to the second portion.

11. The base station (BS) according to claim 10, wherein, in the subframe-associated information, the second subframe is designated as a multicast broadcast single frequency network (MBSFN) subframe.

12. A base station (BS) for use in a downlink Multiple Input Multiple Output (MIMO) system, the base station (BS) comprising:
   a processing unit for generating subframe-associated information which designates a first subframe in which N reference signals are transmitted and a second subframe in which M reference signals (where M>N) are transmitted, within a radio frame; and
   a transmitter for transmitting the subframe-associated information, the first subframe, and the second subframe,
   wherein reference signals corresponding to antenna ports '0' to 'N−1' of the N antennas are mapped to the first subframe, and reference signals corresponding to antenna ports '0' to 'M−1' of the M antennas are mapped to the second subframe.

13. The base station (BS) according to claim 12, wherein positions of reference signals corresponding to antenna ports 'N' to 'M−1' among the M antennas in the second subframe are equal to those of the reference signals corresponding to the antenna ports '0' to 'N−1' among the N antennas in the first subframe.

14. A base station (BS) for use in a downlink Multiple Input Multiple Output (MIMO) system which supports a first user equipment (UE) supporting N transmission antennas among a total of M transmission antennas (where M>N) and a second user equipment (UE) supporting the M transmission antennas, the base station (BS) comprising:
   a processing unit for generating, region-associated information, which discriminates between a first region in which data for the first UE and the second UE is transmitted and a second region in which data only for the second UE is transmitted on a frequency axis within a radio frame having a plurality of subframes; and
   a transmitter for transmitting the region-associated information,
   wherein reference signals corresponding to antenna ports '0' to 'N−1' of the N antennas among the M antennas are mapped to the first region, and reference signals corresponding to antenna ports '0' to 'M−1' of the M antennas are mapped to the second region.

* * * * *